US007207368B1

(12) United States Patent
Lyman, Jr.

(10) Patent No.: US 7,207,368 B1
(45) Date of Patent: Apr. 24, 2007

(54) DUAL USE TAPE DISPENSER

(76) Inventor: Hugh Marion Lyman, Jr., 27639 SE. 401st St., Enumclaw, WA (US) 98022

( * ) Notice: Subject to any disclaimer, the term of this patent is extended or adjusted under 35 U.S.C. 154(b) by 0 days.

(21) Appl. No.: 11/493,147

(22) Filed: Jul. 27, 2006

Related U.S. Application Data

(60) Provisional application No. 60/785,753, filed on Mar. 27, 2006.

(51) Int. Cl.
*B26F 3/02* (2006.01)
*B65H 35/07* (2006.01)
*B32B 37/22* (2006.01)

(52) U.S. Cl. ...................... 156/523; 156/574; 156/577; 156/579; 225/34; 225/35; 225/89

(58) Field of Classification Search ................ 156/574, 156/577, 579, 523; 225/34, 35, 89
See application file for complete search history.

(56) References Cited

U.S. PATENT DOCUMENTS 2,192,634 A * 3/1940 Blomquist .................. 156/494
2,352,445 A 6/1944 Pinckney
2,652,115 A 9/1953 Mysels
2,708,076 A 5/1955 Polster et al.
3,183,752 A 5/1965 Mews
3,193,433 A 7/1965 Tillotson
3,635,383 A 1/1972 Waltz
3,658,628 A * 4/1972 Zenter ........................ 156/527
3,672,550 A 6/1972 Greco
3,707,426 A * 12/1972 Robison ..................... 156/527
3,740,297 A * 6/1973 Vidinsky .................... 156/523
3,768,713 A 10/1973 Lash
3,870,211 A 3/1975 Schriever
3,969,180 A * 7/1976 Ravesloot ................... 156/523
4,104,110 A * 8/1978 Macosko .................... 156/523
4,151,039 A 4/1979 Lash
4,400,231 A * 8/1983 Martin ....................... 156/527
4,488,845 A 12/1984 Dupre
4,527,722 A 7/1985 Strachan
4,582,558 A * 4/1986 Antonson ................... 156/523
4,735,351 A 4/1988 Biswas
5,000,815 A * 3/1991 Hanna ........................ 156/542
5,197,386 A 3/1993 Lin
5,759,342 A 6/1998 Luhman et al.
D399,257 S 10/1998 Tang et al.
6,112,659 A 9/2000 Huang
6,616,087 B1 9/2003 Chern
6,719,180 B2 4/2004 Shah
D504,155 S 4/2005 Crawford et al.
6,951,297 B1 * 10/2005 Lopez ......................... 225/22

* cited by examiner

*Primary Examiner*—Mark A. Osele

(57) ABSTRACT

A dual use tape dispenser consisting of a base frame assembly and a cutting blade assembly pivotally connected to the base frame assembly. Integral with the base frame assembly is an array of pins positioned for holding different size reels of tape. Tape from reels of packaging tape is threaded in one and/or two ways so the tape dispenser can be used as a hand-held and/or a desk-top tape dispenser.

18 Claims, 6 Drawing Sheets

SECTION A-A

DUAL USE TAPE DISPENSER

RELATED APPLICATIONS

This patent application is a continuation-in-part application of co-pending U.S. patent application Ser. No. 60/785,753, filed Mar. 27, 2006, for Duo Use Sealing Tape Dispenser, by Hugh M. Lyman, Jr., included by reference herein and for which benefit of the priority date is hereby claimed.

FIELD OF THE INVENTION

This invention relates to tape dispensers, and more particularly to a dual use device for both hand-held and desk-top use that accommodates reels of tape of different core diameters.

BACKGROUND OF THE INVENTION

Adhesive tape dispensers, also referred to as sealing tape dispensers and packaging tape dispensers, are numerous and have been used for some time. Common tape dispensers are either, hand-held or desk-top. A problem with many tape dispensers is the awkward manipulations required to load a reel of adhesive tape. Considerable tape can be wasted loading tape reels into tape dispensers as it sticks to parts of the tape dispenser or itself. When long lengths of tape are extracted the tape can twist on itself, creating a tangled mess before it can be applied to an article.

Many of the popular tape dispensers used in mailing stores, offices, packaging rooms and mailing rooms are large and complicated mechanisms of considerable weight, but are hand-held. U.S. Pat. No. 5,197,386 issued to Lin, describes a device is made up of dozens of parts and is relatively heavy. This and other hand-held tape dispensers similar to U.S. Pat. No. 5,759,342 have a similar characteristic in that the tape end, when being applied to a package is a considerable distance from the operating hand, thereby limiting the control for positioning and cutting the tape being applied to the package. Further, as with many hand-held tape dispensers, when finished applying and cutting the tape, a flap of tape several inches long extends from the device, free to stick to places not desired.

Smaller hand-held tape dispensers are known in the art, as shown in U.S. Pat. No. 6,719,180 issued to Shah. This tape dispenser is small, light weight and economical, but is limited to use with only a single small reel of adhesive tape.

There are many desk-top tape dispensers. One design is illustrated in U.S. Pat. D504,155 issued to Crawford et al. Most of these types of dispensers are used mainly for narrow width masking tape. As common packaging tape is two inches wide and reasonably sticky, some effort is required to extract the tape from the tape reel. With this in mind, desk-top tape dispensers are either heavy or provided with suction cups to hold the dispenser stationary while tape is extracted.

Multiple roll tape dispensers are numerous as described in U.S. Pat. No. D399,257 issued to Tang et al. These tape dispensers, however are not designed for hand-held use.

Heretofore, prior art fails to address an adhesive backed tape dispenser that is light weight and can be used as a desk-top device and/or a hand-held device, is easy to load and provides a means where extracted tape is prevented from tangling or sticking to itself or other undesirable objects.

It is therefore an object of the invention to provide a tape dispenser that can be used as a desk-top device and/or a hand-held device.

It is another object of the invention to provide a simple tape dispensing device into which a reel of adhesive backed tape can be loaded easily and conveniently.

It is another object of the invention to provide a tape dispenser that dispenses adhesive backed tape quickly and easily.

It is another object of the invention to provide a tape dispenser that facilitates holding extracted tape with both hands to keep it from tangling.

It is another object of the invention to provide a tape dispenser that is light in weight.

It is another object of the invention to provide a tape dispenser that is of simple construction.

It is another object of the invention to provide a tape dispenser that is economical to produce.

It is another object of the invention to provide a tape dispenser that can accommodate different size reels of tape.

It is another object of the invention to provide a tape dispenser that can be conveniently clamped to a desk-top.

It is another object of the invention to provide a tape dispenser that prevents a loose tape end from becoming stuck to unintentional objects.

It is another object of the invention to provide a tape dispenser that can hold more than one roll of tape.

SUMMARY OF THE INVENTION

In accordance with the present invention, there is provided a tape dispensing device for dispensing and applying adhesive backed tape in a hand-held and/or desk-top configuration. Hand-held, the device is portable, the device being positioned appropriately by the operator. Desk-top, the device is stationary, conveniently at rest on a desk-top or work-top while tape is extracted by the operator.

The inventive device consists of two components: a base frame and a pivotal blade handle. The base frame is open on one side for conveniently threading the tape end to the desired configuration. The open side of the dispenser and the pivotal blade handle provides for convenient tape feeding. Pins positioned on the device hold a large diameter tape reel or up to two small diameter reels of tape for dual use thereof. Pin tabs on master pins hold the tape reels and restrict them from falling off of the dispenser. Further, the pin configuration allows easy turning of the tape reel while restricting the tape reel from free spooling. In the hand-held configuration the tape is fed through a gap between a pressure bar and the leading edge of a bottom plate. For the desk-top configuration the tape is fed under an upwardly pivotal blade handle and over a crossbar where the tape end extends beyond the provided crossbar. Scalloped finger grips on both side components provide for comfortably holding the device.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the figures. For purposes of brevity the 'dual use tape dispenser' will be referred to as 'device'.

Figure 1:
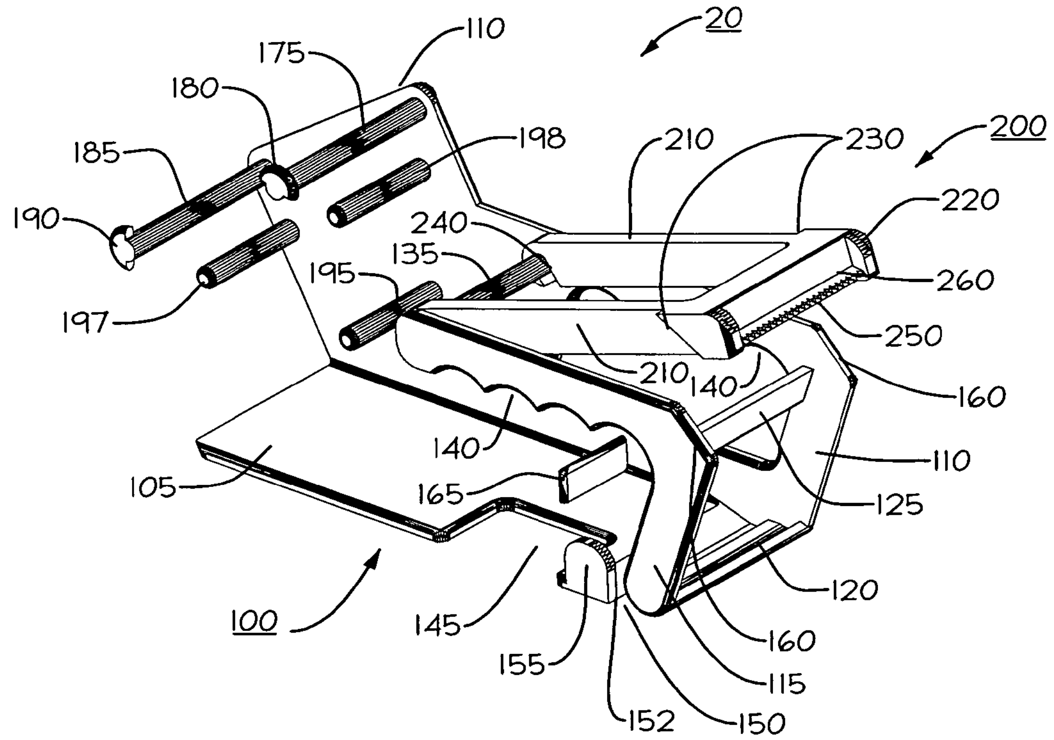
FIG. 1 is an isometric left side view of the tape dispensing device in accordance with the present invention.

The following reference numerals are used to indicate the parts and environment of the invention.

| | |
|---|---|
| 20 | device |
| 100 | base frame assembly |
| 105 | bottom plate |
| 110 | right side panel |
| 115 | left side arm |
| 120 | pressure bar |
| 125 | crossbar |
| 135 | axle pin |
| 140 | finger grips |
| 145 | finger notch |
| 150 | tape gap |
| 152 | bottom plate leading edge |
| 155 | tape retainer tab |
| 160 | tapered corner |
| 165 | gusset block |
| 170 | hand cutout |
| 175 | master pin |
| 180 | pin tab |

-continued

| | |
|---|---|
| 185 | master pin |
| 190 | pin tab |
| 195 | slave pin |
| 197 | slave pin |
| 198 | slave pin |
| 199 | rotating reel holder |
| 200 | blade handle assembly |
| 210 | blade handle arm |
| 215 | space |
| 220 | finger guard |
| 230 | finger grasp |
| 240 | slotted pin hole |
| 250 | cutting blade |
| 260 | cutting blade slot |
| 300 | large tape reel |
| 305 | small tape reel |
| 306 | medium tape reel |
| 310 | tape |
| 320 | tape reel core |
| 330 | cut tape end |
| 340 | cut tape end |
| 410 | thumb finger |
| 420 | index finger |
| 430 | thumb finger |
| 440 | index finger |
| 500 | package |
| 510 | package lid |
| 520 | spring clamp |
| 530 | desk-top |

DESCRIPTION OF THE PREFERRED EMBODIMENT

The following description, taken in conjunction with the drawings, sets forth the preferred embodiment of the present invention in such a manner that anyone with ordinary skill can make and use the invention. The embodiment of the invention disclosed herein is the best method envisioned by the inventor for use in a home and office environment, although it should be understood that various modifications can be accomplished within the scope of the present invention.

Referring now to the drawings, and in particular to FIG. 1, the device 20 comprises two assemblies: base frame assembly 100 which provides a stationary platform, and blade handle assembly 200 which provides for tape cutting.

The base frame assembly 100 comprises a bottom plate 105 rigidly connected orthogonally to a right side panel 110, a crossbar 125, a pressure bar 120 and an axle pin 135, all rigidly connected orthogonally to the right side panel 110. Further, a left side arm 115 is rigidly connected orthogonally to the crossbar 125, the pressure bar 120 and the axle pin 135. The left side arm 115 is provided with finger grips 140. A gusset block 165 is rigidly connected to the bottom plate 105 and the right side panel 110. In the forward portion of the bottom plate 105 is provided a finger notch 145. A tape gap 150 is disposed between the bottom plate 105 and the pressure bar 120. Rigidly connected orthogonally to the bottom plate 105, and perpendicular to the bottom plate leading edge 152 is a tape retainer tab 155. Rigidly, connected behind the axle pin 135 to the right side panel 110 is an array of spool pins to support a tape reel: top master pin 175, bottom master pin 185, slave pin 195, slave pin 197 and slave pin 198. At the ends of the top and bottom master pins 175, 185 are rigidly connected pin tabs 180, 190, respectively. The device 20 can be made from wood, metal and/or plastic materials.

Figure 2:
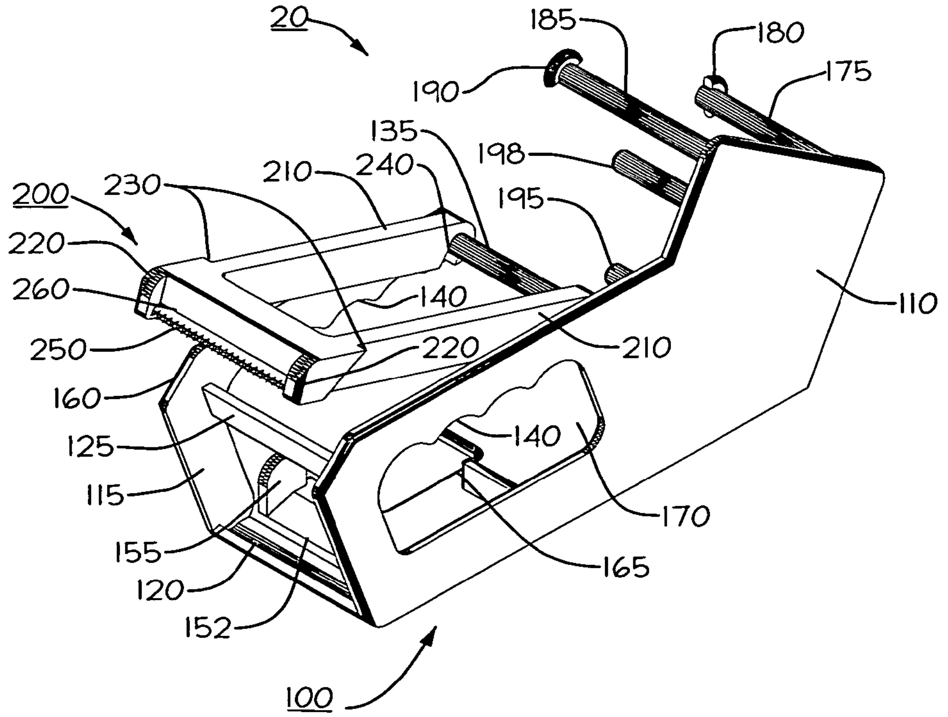
FIG. 2 is an isometric right side view of the tape dispensing device.

FIG. 2 illustrates the hand cutout 170 which accommodates the finger grips 140 in the right side panel 110. Finger grips 140 are shown also on the left side arm 115. The device 20 can be used either right- or left-handed.

Figure 3:
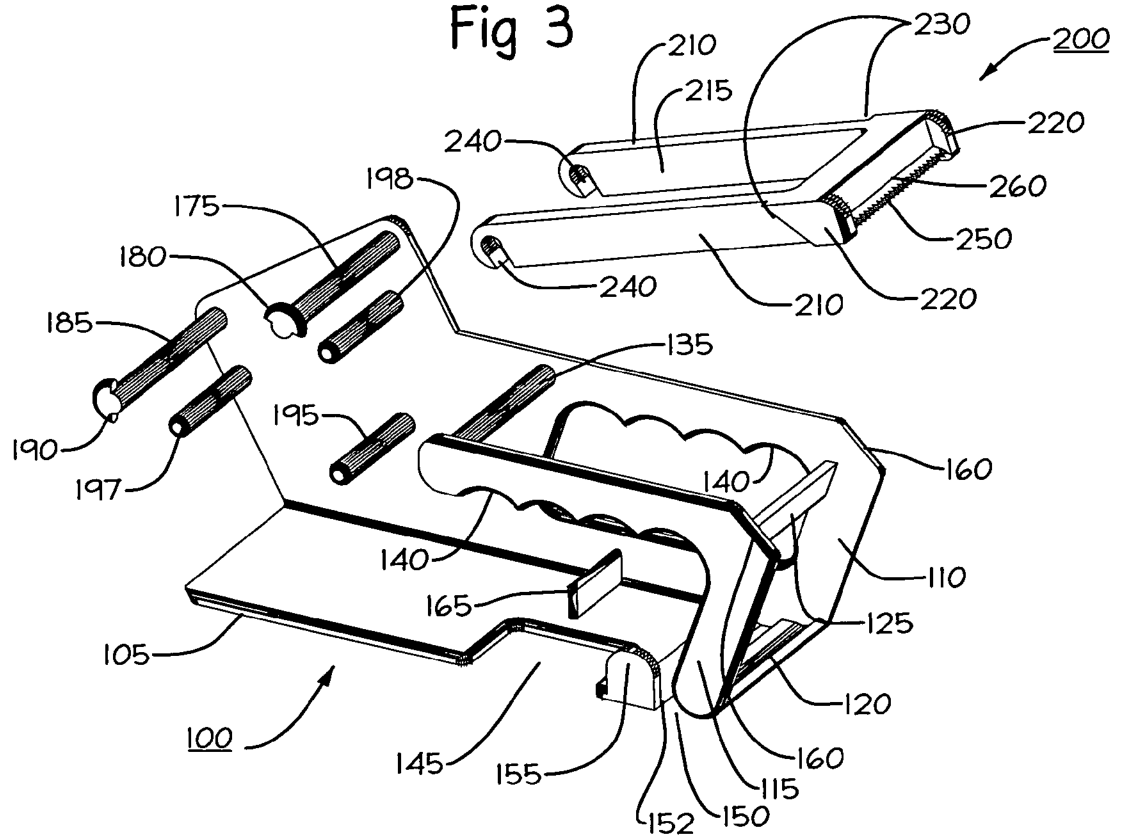
FIG. 3 is an isometric left side expanded view of the tape dispensing device.

FIG. 3 is an expanded view showing the blade handle assembly 200 separated from the base frame assembly 100. The blade handle assembly 200 has two blade handle arms 210. As evident to anyone skilled in the art, the blade handle assembly 200 may be of varying designs, such as configured to receive batteries and a thermo cutting blade, not shown. At the rear of the blade handle arms 210 are slotted pin holes 240, wherein the blade handle assembly 200 pivotally attaches to the axle pin 135 and rests on the crossbar 125 in the closed position. The slotted portion of the slotted pin hole 240 is slightly undersized, wherein when the blade handle assembly 200 is snapped onto the axle pin 135 it is pivotally and removably connected to the base frame assembly 100. The blade handle assembly rests on the crossbar in a closed position when cutting tape in both hand-held and/or desk-top configuration. To anyone ordinarily skilled in the art it would be apparent that the blade handle assembly 200 may be either permanently connected pivotally to the axle pin, by omitting the slot in the slotted pin hole.

The blade handle assembly 200 fits between and flush with the top edges of the right side panel 110 and left side arm 115. At each front corner of the blade handle assembly 200 are protruding finger grasps 230 which fit to the tapered corners 160 of the base frame assembly 100 when the blade handle assembly 200 is closed.

Finger grasps 230 are flush with the outside faces of the right side panel 110 and left side arm 115. The finger grasps 230 protrude beyond the position of the cutting blade 250 providing finger guards 220. Disposed in the front edge of the blade handle assembly 200 is a cutting blade slot 260 for receiving and permanently holding the cutting blade 250. Anyone with ordinary skill in the art would realize there are varying methods for attaching the cutting blade.

Figure 4:
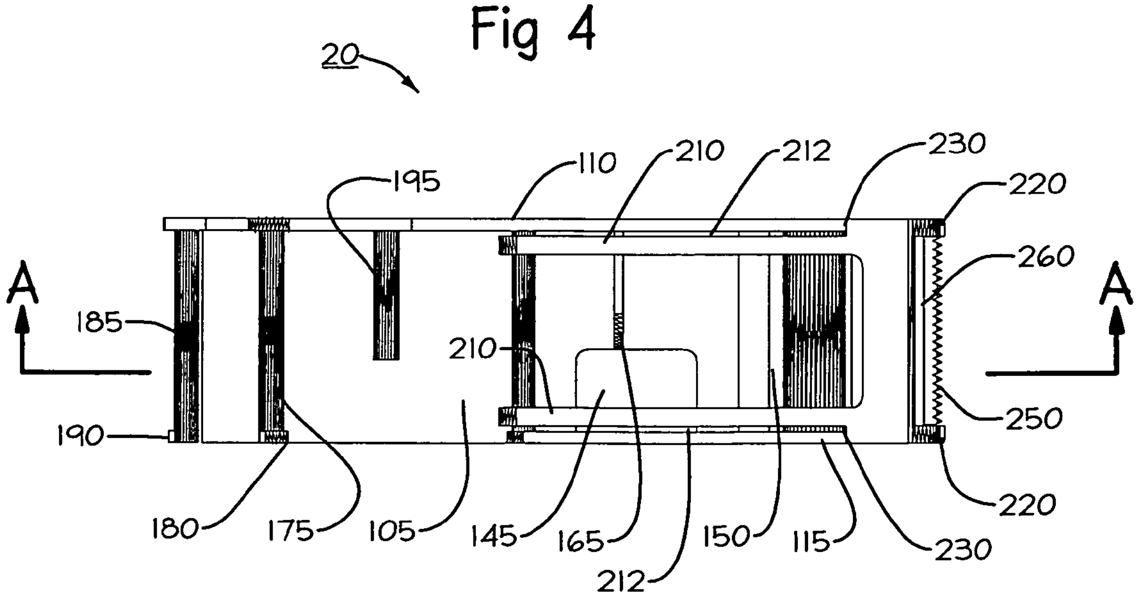
FIG. 4 is a top view of the present invention.

FIG. 4 is a top view of the preferred embodiment, illustrating clearly the length of the slave pins 195, 197, 198 which are shorter than the top and bottom master pins 175, 185. A space 215 is provided between the blade handle arms 210 and the right side panel 110 and left side arm 115 to allow the right side panel 110 and left side arm 115 to flex at the finger grips 140 and thereby provide a soft grip feature.

Figure 5:
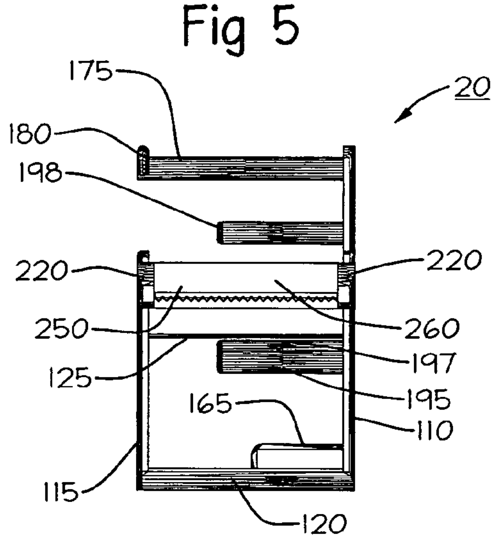
FIG. 5 is a front view of the present invention.

FIG. 5 is front view of the inventive tape dispenser illustrating the relative length of the slave pins 195, 197 and 198.

Figure 6:
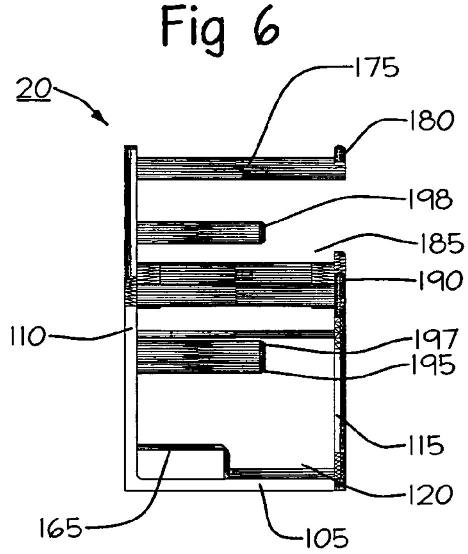
FIG. 6 is a back view of the present invention.

FIG. 6 is the back view of the inventive tape dispenser 20. Here also is shown proportional length of the slave pins 195, 197, 198 in relation to the length of the top and bottom master pins 175, 185.

Figure 7:
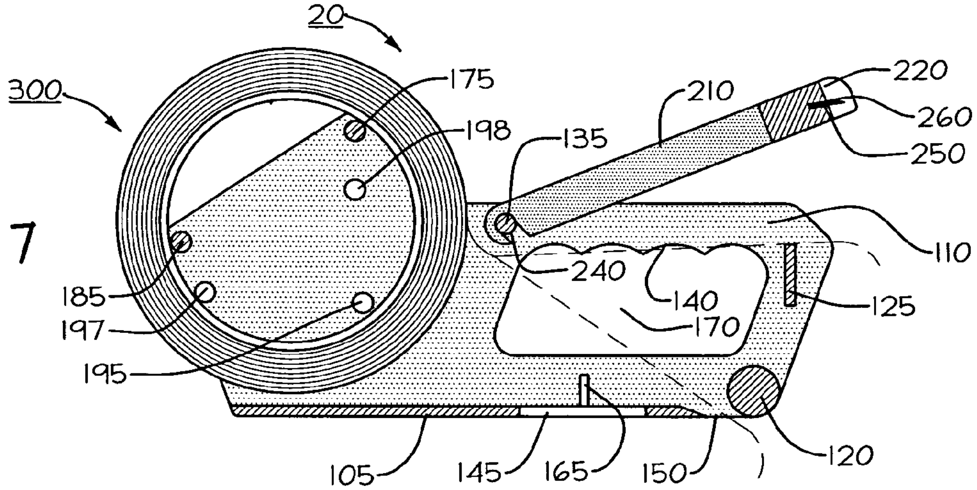
FIG. 7 is a section view of the tape dispensing device as taken along lines A—A in FIG. 4 with a large diameter reel of tape installed in the device.

FIG. 7 is a sectional view of the preferred embodiment as taken along lines A—A in FIG. 4 with a large diameter tape reel 300 in position after being mounted. The dashed lines indicate the two options for feeding the tape 310, wherein the top dashed line represents the tape 310 fed for the device 20 being used in the desk-top configuration and the bottom dashed line representing the configuration for hand-held use. With a large diameter tape reel 300 the device 20 can be configured for either hand-held or desk-top use.

Figure 8:
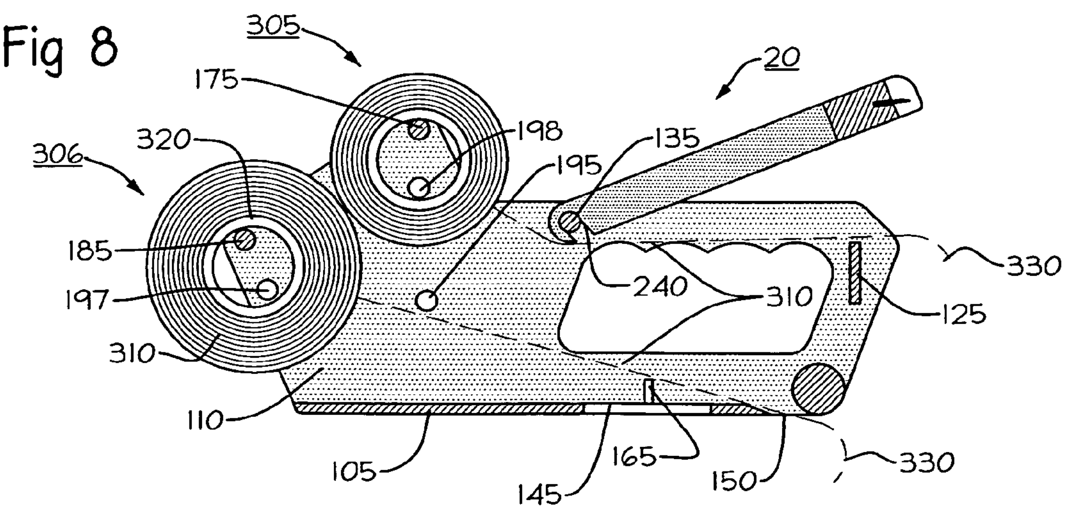
FIG. 8 is a section view of the inventive tape dispensing device as taken along line A—A of FIG. 4 with two small diameter reels of tape mounted in position.

FIG. 8 is the same sectional view as FIG. 7 with two small diameter tape reels 305 shown in place. The strategic position of the slave pins 197, 198 affords easy installation of the small diameter tape reels 305 while preventing them from falling off of the device 20 when the device 20 is oriented or rotated while being used in the hand-held configuration.

The dashed line from the top front small tape reel 305 indicates feeding the tape 310 under the blade handle assembly 200 and over the crossbar 125 for the desk-top configuration. The dashed line from the rear bottom tape reel 305 indicates feeding the tape 310 down and through the tape gap 150 for hand-held use. With two small diameter tape reels 305 the device 20 can be used in either hand-held or desk-top configurations without changing the tape feeding position as is required with one large diameter tape reel 300.

Figure 9:
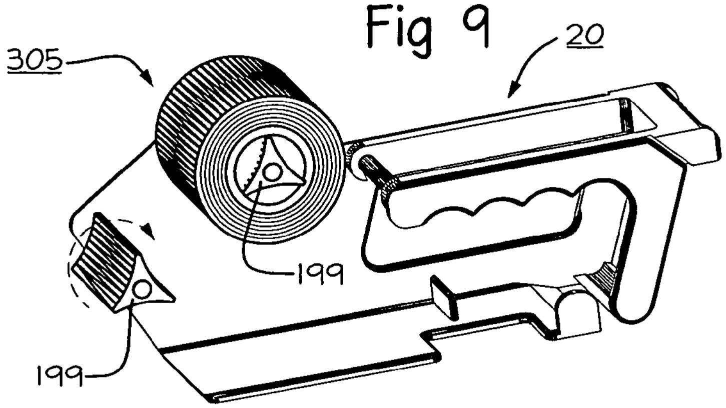
FIG. 9 is a perspective view of an alternate embodiment of the tape dispensing invention with rotating reel holders in place of an array of pin holders.

As evident to anyone ordinarily skilled in the art it would be evident that the device 20 may be constructed to also hold two large diameter tape reels 300 or constructed to hold one small diameter tape reel 305 and one medium diameter tape reel 306 or any combination thereof. Further it would be evident to anyone skilled in the art that rotating reel holders 199 could be substituted for the array of pins 175, 185, 195, 197, 198 as illustrated in FIG. 9. The device 20 can hold two different diameter tape reels or even one large rotating reel holder.

Figure 10:
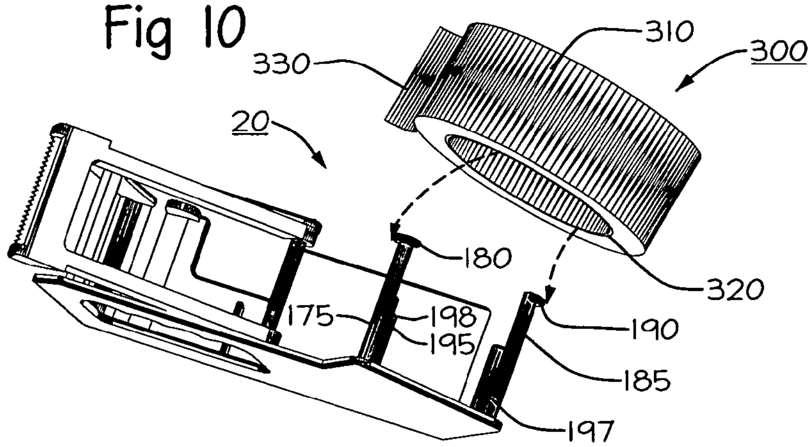
FIG. 10 is a perspective process view of the tape dispensing invention illustrating the tilting position of a reel of tape for mounting in the dispenser.

FIG. 10 illustrates mounting the large tape reel 300, it being positioned to mount to the device 20. The large tape reel 300 is slightly tilted and placed over the pin tabs, 180, 190 at the opposing quadrants at the inside of the tape reel core 320. The large tape reel 300 is pressed over the pin tabs 180, 190 on to the assembly at a tilted angle, the tape reel core 320 contacts the outside edge of slave pin 195 at an equal distance from the pin tabs, 180, 190 and slips into a full locking position on the three pins 175, 185, 195. The strategic position of master pins 175, 185 and the slave pin 195 restrains the large tape reel 300 from falling off of the device 20 in any position. The large tape reel 300 can be as easily removed as it is installed. The placing of the small diameter tape reels 305 is accomplished in a similar manner but requires only two pins 175, 198 for the top tape reel 305 and two pins 185, 197 for the bottom tape reel 306 as shown in FIG. 8.

Figure 11:
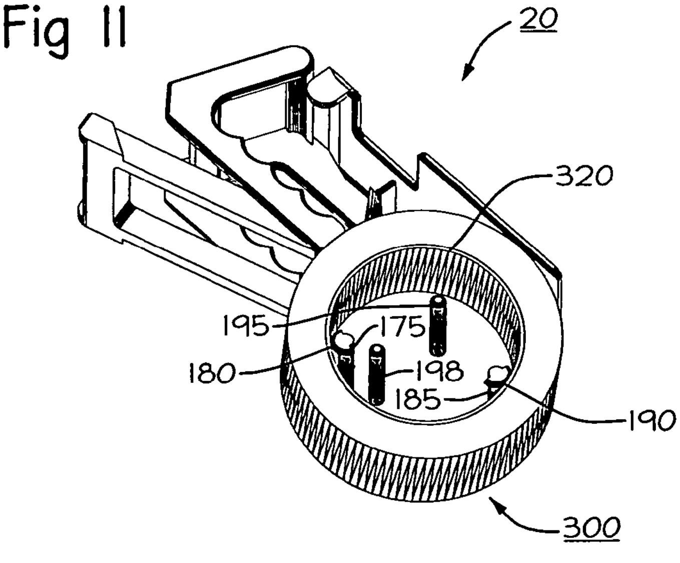
FIG. 11 is a perspective process view of the invention with the reel of tape further positioned onto the array of pin holders.

FIG. 11 illustrates further the process of the large tape reel 300 as it is installed over the master pins 175, 185 in a tilted position. At this position the pin tabs 180, 190 are centered at the opposite quadrants of the tape core 320. Once the slave pin 195 is engaged by the tape core 320 the large tape reel 300 is further pressed onto the device 20. The slave pin 195 forces the tape reel core 320 off center on the master pins 175, 185 allowing the outside edge of the large tape reel core 320 to snap inside the pin tabs 180, 190 thereby preventing the large tape reel 300 from dislodging during use.

Figure 12:
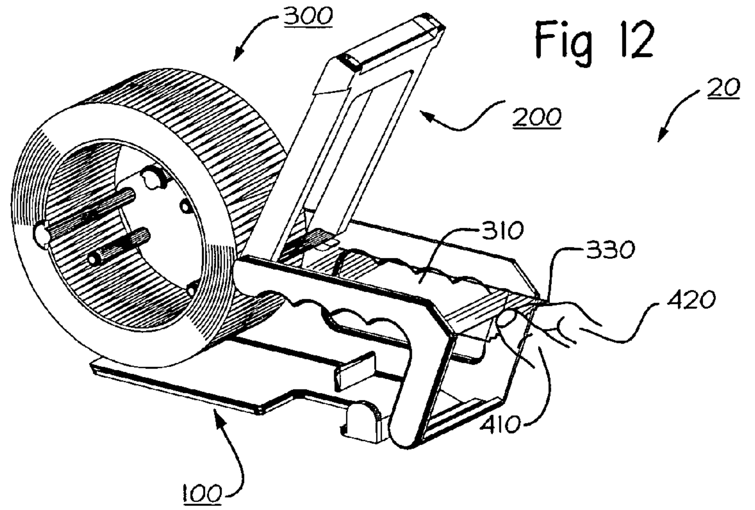
FIG. 12 is a perspective process view of the invention in the desk-top configuration with tape being extracted.
Figure 15:
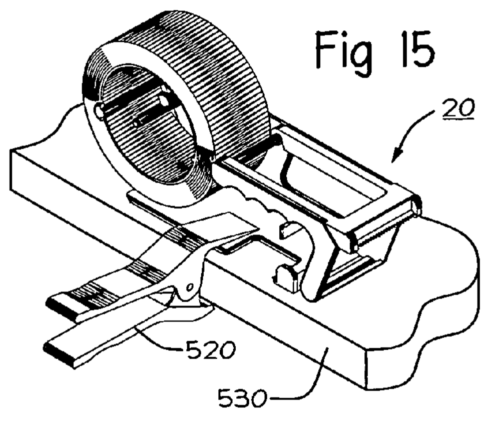
FIG. 15 is a perspective view of the invention illustrating how the device is clamped to a work-surface.

Referring to FIG. 12 illustrated is the process for extracting tape 310 from the device 20 in the desk-top configuration, whereby the tape dispenser is resting stationary on desk-top 530 (see FIG. 15). The distance between the cutting blade 250 and top of the crossbar 125 provides approximately one inch of loose cut tape end 330 ready for griping by the thumb 410 and the index finger 420. The blade handle assembly 200 is pivoted up and out of the way with one hand gripping the finger grasps 230, while the tape end 330 is pulled by the thumb 410 and the index finger 420 of the other hand extracting the tape 310 to the desired length.

Figure 13:
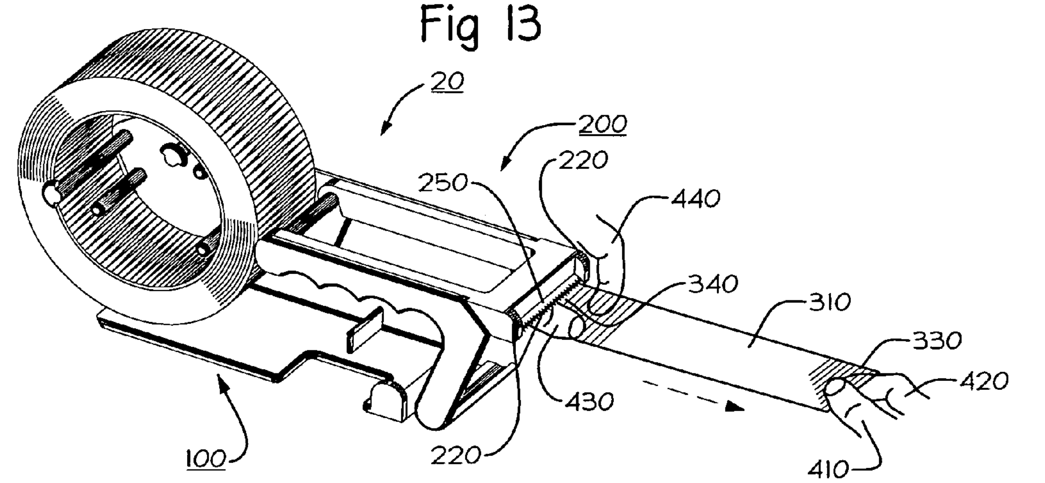
FIG. 13 is a perspective process view of the invention illustrating how the tape is cut in the desk-top configuration.

The blade handle assembly 200 is then closed, as shown in FIG. 13. With the heal of one hand resting on the blade handle assembly 200, holding it closed, the index finger 440 of this hand extends over the finger guards 220 making contact with the adhesive side of the tape 310. By pulling up on the tape 310 it is cut by the cutting blade 250 at the cut tape end 340.

Figure 14:
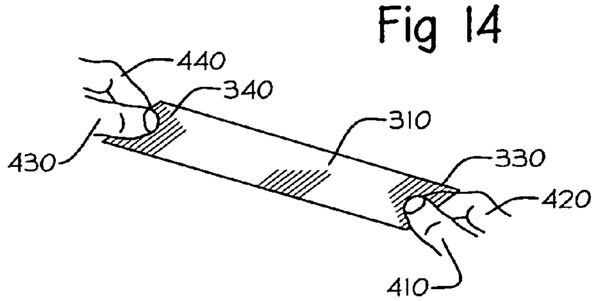
FIG. 14 is a perspective process view of a strip of tape held between two hands after being cut.

Referring to FIG. 14 the cut tape end 330 being held by the thumb 410 and the index finger 420 and the cut tape end 340 being held by the other hand thumb 430 and index finger 440 shows the tape being held tight and restricted from sticking to itself or an object until the user places it where desired. This process is very simple and fast.

FIG. 15 illustrates the device 20 clamped to a desk-top 530 with a spring clamp 520. Clamping the device 20 to a desk-top 530 is not required with the device 20 configured for desk-top use, but may be convenient under some conditions.

Figure 16:
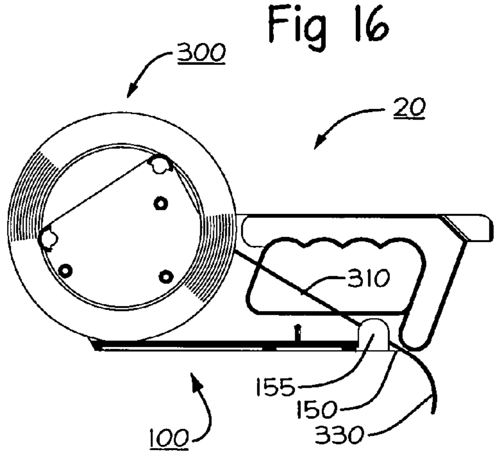
FIG. 16 is a process left side view of the tape dispenser showing a large diameter tape reel installed and the tape fed for hand-held use.
Figure 17:
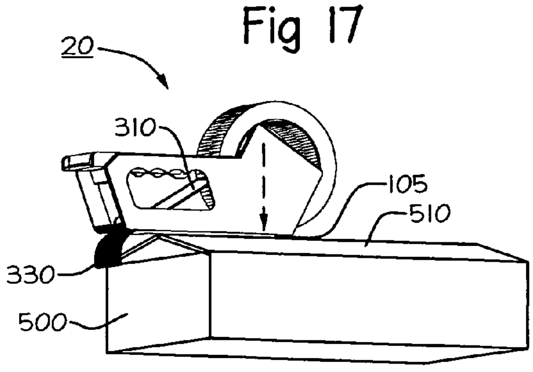
FIG. 17 is a perspective process view of the inventive device holding down the lids of a package to begin the application of tape to the package.
Figure 18:
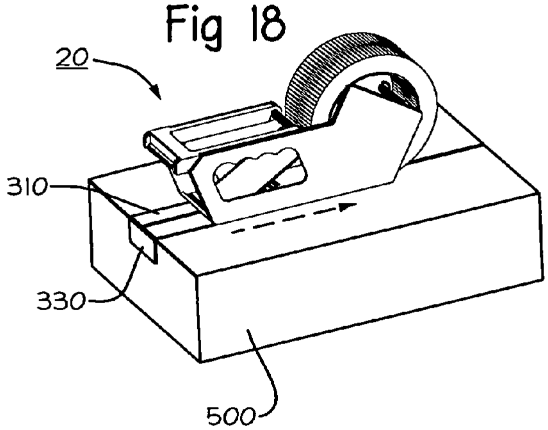
FIG. 18 is a perspective process view of the device moving across the package sealing the lids of the package.
Figure 19:
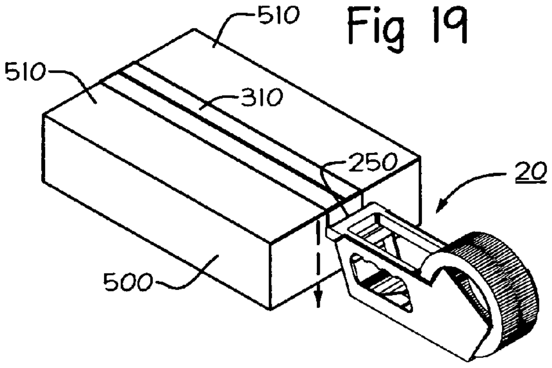
FIG. 19 is a perspective process view of the inventive device at the position where the tape is cut after sealing the package.

Referring to FIG. 16 the tape 310 of large tape reel 300 is positioned for hand-held use. This process functions similar to other hand-held devices, however offers several advantages. The flat bottom of the device 20 makes it easy to hold down the package lids 510 of package 500 as shown with a down arrow in FIG. 17. The tape end 330 is pressed against the end of the package 500 and with one hand the device 20 is pulled in a rearward motion, along the joint of the package lids 510, shown in FIG. 18. The tape retainer tab 155 shown in FIG. 16 prevents the tape 310 from inadvertently slipping out of the tape gap 150 while tap 310 is being extracted from the device 20. The pressure bar 120 seals the tape 310 to the package lids 510 as the tape is applied. To anyone ordinarily skilled in the art it would be evident that the pressure bar 120 could be a rotating cylindrical roller as shown in prior art. As the hand is close to the tape 310, control of the tape 310 is enhanced for easy positioning. At the opposite end of the package 500 (see FIG. 19) the device 20 is pulled down in the same horizontal position illustrated in FIG. 18, applying tape 310 to the package 500 end. At the point desired for cutting the tape 310 with the cutting blade 250, all that is required is a slight twist of the wrist of the hand holding the device 20.

Figure 20:
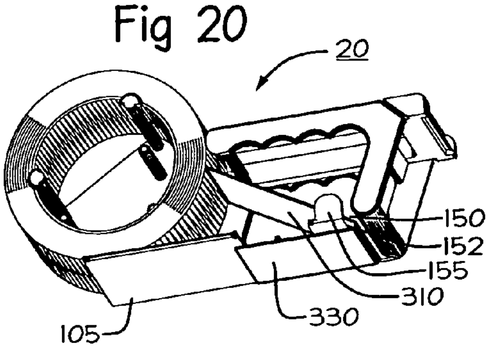
FIG. 20 is a perspective process view of the invention illustrating how the tape end is secured after use, preventing it from sticking to other objects.
Figure 21:
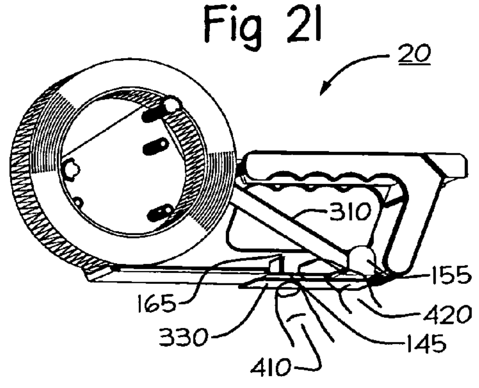
FIG. 21 is a perspective process view of the invention illustrating how the tape is released when the operator is ready to use the device after storage in the hand-held configuration.

Referring to FIG. 20, after the process of applying tape to a package 500 is completed and the device 20 is to be stored for future use, the tape end 330 is pulled back against the front edge of the bottom plate 105 at the tape gap 150 and stuck to the bottom of the bottom plate 105, thereby safely keeping the tape end 330 from sticking to undesired objects while in storage. If at anytime the tape 310 between the large tape reel 300 and the tape gap 150 becomes slack within the device 20, a gusset block 165 prevents the tape 310 from contacting itself where the adhesive side of the tape end 330 is exposed at the finger notch 145. The next time the device 20 is used, the tape end 330 is released from the bottom of the bottom plate 105 with the thumb 410 and the index finger 420 at the finger notch 145, as shown in FIG. 21.

Since other modifications and changes varied to fit particular operating requirements and environments will be apparent to those skilled in the art, the invention is not considered limited to the example chosen for purposes of disclosure, and covers all changes and modification which do not constitute departures from the true spirit and scope of this invention.

Having thus described the invention, what is desired to be protected by Letters Patent is presented in the subsequently appended claims.

The invention claimed is:

1. A dual use tape dispenser device for extracting and cutting adhesive backed tape from at least one tape reel, comprising two configurations, whereby said tape is extracted and applied to a surface from said tape reel with portable motion of said tape dispenser being hand-held, and said tape is extracted from said tape reel wherein said tape dispenser is resting stationary on a desk-top or a work-surface, comprising:

(a) a base frame, having a bottom plate orthogonally connected rigidly to a right side panel;

(b) a pressure bar rigidly or rotatably connected orthogonally to said right side panel, disposed to provide a gap between said pressure bar and the leading edge of said bottom plate, whereby said tape is extracted from said tape dispenser through said gap, thereby configuring said tape dispenser for said hand-held use thereof;

(c) a crossbar rigidly connected orthogonally to said right side panel, whereby said tape is extracted over said crossbar, thereby configuring said tape dispenser as said stationary desk-top device;

(d) an axle pin rigidly connected orthogonally to said right side panel of said base frame;

(e) a left side arm rigidly connected orthogonally to said crossbar and said axle pin, said pressure bar rigidly or rotatably connected to said left side arm;

(f) a blade handle assembly provided with at least one blade handle arm, having an axle pin hole disposed at the end of said blade handle arm, said blade handle pivotally attached to said axle pin, whereby said blade handle rests on the top of said cross bar in a closed position and pivots upwardly to provide a means for feeding said tape over said crossbar;

(g) a cutting blade disposed in said blade handle assembly, whereby providing a means for cutting said tape from said tape reel;

(h) a means for holding at least one said tape reel on said base frame assembly.

2. The dual use tape dispenser device as recited in claim 1, wherein said means for holding at least one tape reel on said base frame assembly comprises, at least one spool pin connected orthogonally behind said axle pin, to said right side panel.

3. The dual use tape dispenser device as recited in claim 1, wherein said means for holding at least one tape reel on said base frame assembly comprises, at least one rotating reel holder connected orthogonally rotatably behind said axle pin, to said right side panel.

4. The dual use tape dispenser device as recited in claim 1, wherein provided is a hand cutout in said right side panel.

5. The dual use tape dispenser device as recited in claim 4, wherein provided are finger grips in said hand cutout and said left side arm.

6. The dual use tape dispenser device as recited in claim 1, wherein said blade handle assembly comprises at least one of the following group: finger guard for protecting fingers from contact with said cutting blade on said blade handle assembly and finger grasp for gripping said blade handle assembly.

7. The dual use tape dispenser device as recited in claim 1, wherein provided is at least one of the following group: finger notch in said bottom plate, gusset block rigidly connected to said bottom plate and tape retainer tab rigidly connected to said bottom plate.

8. The dual use tape dispenser device as recited in claim 2, wherein provided is at least one pin tab rigidly connected orthogonally to at least one said spool pin.

9. The dual use tape dispenser device as recited in claim 1, wherein said dual use tape dispenser comprises at least one of the following group: metal, wood, plastic.

10. A tape dispenser device for dispensing adhesive backed tape from at least one tape reel, comprising:

(a) a base frame assembly, providing a means for feeding said tape in a hand-held and/or a desk-top configuration, having a bottom plate orthogonally connected to a right side panel;

(b) a pressure bar rigidly or rotatably connected orthogonally to said right side panel, positioned to provide a gap between said pressure bar and the leading edge of said bottom plate, whereby said tape is fed through said gap in said hand-held configuration;

(c) a crossbar rigidly connected orthogonally to said right side panel, whereby said tape is fed over said crossbar in said desk-top configuration;

(d) an axle pin rigidly connected orthogonally to said right side panel;

(e) a left side arm rigidly connected orthogonally to said crossbar and said axle pin, and said pressure bar connected rigidly or rotatably to said left side arm;

(f) a blade handle assembly having a cutting blade disposed therein, at least one blade handle arm having an axle pin hole disposed at the end of said blade handle arm, said blade handle pivotally attached to said axle pin, whereby said blade handle pivots upwardly on said axle pin, providing a means for feeding said tape over said crossbar, wherein said blade handle assembly rests closed on said crossbar in position for cutting said tape in both said hand-held and said desk-top configurations;

(g) a means for supporting at least one said tape reel on said tape dispenser device.

11. The tape dispenser device as recited in claim 10, wherein said means for supporting at least one said tape reel on said tape dispenser comprises, at least one spool pin connected orthogonally behind said axle pin, to said right side panel.

12. The tape dispenser device as recited in claim 10, wherein said means for supporting at least one said tape reel on said tape dispenser comprises, at least one rotating reel holder connected rotatably to said right side panel behind said axle pin.

13. The tape dispenser device as recited in claim 10, wherein provided is a hand cutout in said right side panel.

14. The tape dispenser device as recited in claim 13, wherein provided are finger grips in said hand cutout and said left side arm.

15. The tape dispenser device as recited in claim 10, wherein said blade handle assembly comprises at least one of the following group: finger guard for protecting fingers from contact with said cutting blade and finger grasp for finger gripping said blade handle assembly.

16. The tape dispenser device as recited in claim 10, wherein said base frame assembly comprises at least one of the following group: finger notch in said bottom plate, gusset block rigidly connected to said bottom plate and tape retainer tab rigidly connected to said bottom plate.

17. The tape dispenser device as recited in claim 11, wherein provided is at least one pin tab rigidly connected orthogonally to one said spool pin.

18. The tape dispenser device as recited in claim 10, wherein said dual use tape dispenser comprises at least one of the following group: metal, wood, plastic.

* * * * *